Sept. 1, 1959 C. B. SHELMAN 2,902,608

MAGNETIC CORE SWITCHING CIRCUIT

Filed May 28, 1957

INVENTOR.
CECIL B. SHELMAN

BY

Walter J. Jason

ATTORNEY

United States Patent Office 2,902,608

Patented Sept. 1, 1959

2,902,608

MAGNETIC CORE SWITCHING CIRCUIT

Cecil B. Shelman, Fort Worth, Tex., assignor to General Dynamics Corporation, San Diego, Calif., a corporation of Delaware Application May 28, 1957, Serial No. 662,216

7 Claims. (Cl. 307—88)

This invention relates to switching circuits and more particularly to magnetic core switching circuits which are not adversely affected by nuclear radiation bombardment and extreme thermal conditions.

Heretofore, magnetic core switching circuits have been used in basic logical switching, such as in computers, telemetering, automatic controls and other fields using pulsed information. However, these circuits utilized diodes and other unidirectional energy control devices. These have been the least reliable of the components in such circuits under normal environmental conditions. In addition, nuclear radiation and extreme thermal conditions have an adverse effect on these devices.

The present invention utilizes magnetic core switching circuits which perform switching operations without the use of diodes. In the basic circuit the switching characteristics are not materially affected by their deletion and with the least reliable component thus removed, the reliability of the circuit is enormously improved. This is accomplished by providing parallel paths for the driving pulse to follow. An input pulse controls the state of saturation or non-saturation of a first core which in turn determines whether an increased impedance will appear in one of the paths. If an increased impedance appears, the driving pulse passes through the other path, producing an output. If no increased impedance appears, the driving pulse passes through the first path and no output results. The presence or absence of this increased impedance, which controls the output, is determined by the saturated or unsaturated condition of the first magnetic core which in turn is due to an input pulse applied thereto or the non-existence of the input pulse at the time of the driving pulse. Each of the paths have biased cores therein which retard current flow when not in saturated condition but present very small impedance to current flow when in saturated condition.

It is therefore an object of this invention to provide for a novel magnetic core switching circuit.

Another object is the provision of a switching circuit immune to the effects of nuclear radiation and extreme thermal conditions.

Another object is the provision of a diodeless magnetic core switching circuit.

Another object is the provision of a magnetic core switching circuit which maintains its switching characteristics without the use of diodes.

Another object is the provision of a switching circuit having parallel paths and means for selectively directing pulse flow through the paths.

Still another object is the provision of a switching circuit having parallel paths and means for selectively varying the impedances therein to thereby direct energy flow therethrough.

Other objects and features of the present invention will be readily apparent to those skilled in the art from the following specification and appended drawings wherein is illustrated a preferred form of the invention, and in which.

Figure 1:
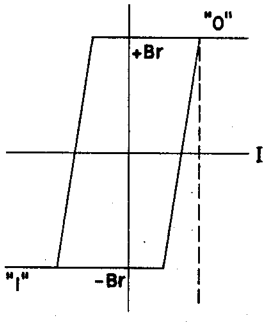
Figure 1 shows a typical magnetization curve of magnetic cores used in switching operations.

Reference is now made to the magnetization curve in Figure 1. When a current of one polarity is induced in one direction in a coil around a piece of magnetic material, the piece is magnetized in a positive direction, for example. The greater the current flow, the higher the state of magnetization of the piece until it becomes saturated and the curve flattens out as shown at "0." A current of opposite polarity or of the same polarity but in the opposite direction will magnetize the piece in the opposite direction. When the piece is saturated the curve flattens out as shown at "1." Different types of materials require different amounts of current and different numbers of turns of the wires in the coils. The magnetization curves also differ with each type of material used. However, in the magnetic core switching art the type of core material, the number of turns, the size of the wire in the coils and the voltages required to drive the cores to saturation are well known and in this respect the components used are of conventional design.

During the time a core is being magnetized by current flow in the coil but before it reaches saturation, the coil presents an impedance to current flow therein but when the core becomes saturated, very little impedance is presented. Thus the magnetization state of saturable magnetic cores in the parallel circuit paths will determine which path has the least impedance and therefore within which path the current will flow. This principle is applied in the schematic circuit shown in Figure 2. Here core 3 and core 4 are biased to saturation in the direction shown by arrows 11 and 12 by a unidirectional current source E. An A drive pulse circuit extends from a drive pulse source, not shown, through coil N*b* of core 1 to a point 13 where it branches into parallel circuits. One circuit extends through coil N*a* of core 3, through coil N*a* of core 1 and to return path 14. This is a pulse return path. The other circuit extends from point 13 through coil N*a* of core 4, through coil N*a* of core 2 and to return path 14. This is the pulse transfer path. Core 2 has an output coil N*c* which produces an output pulse in response to energy flow in coil N*a* of core 2 when this core is not in saturated condition. Coil N*c* on core 1 is connected to an X input pulse source, not shown.

Figure 2:
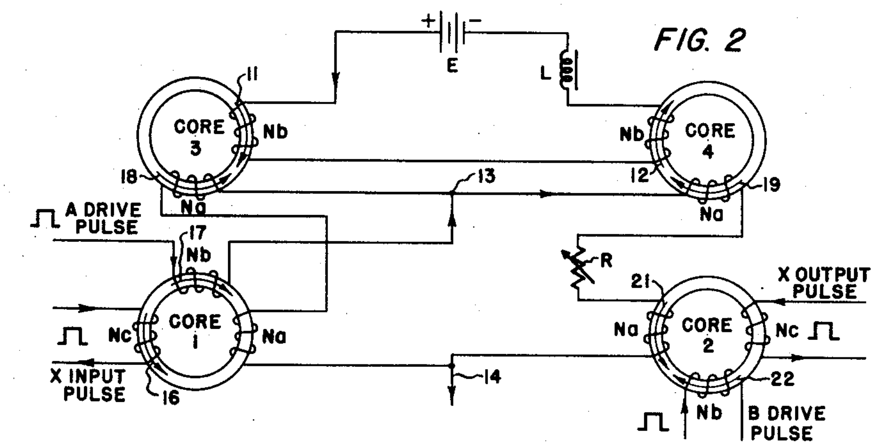
Figure 2 is a schematic with arrows used to explain the operation of the circuit when a "1" is stored in core 1.

The circuit in Figure 2 is operated by alternate A drive pulse and B drive pulse trains. These pulses occur with sufficient time intervals to permit the biased cores to recover, as will hereinafter become more fully explained. The X input pulse information enters core 1 at the same time the B drive pulse interrogates core 2, transferring the information to the next core (not shown). Thereafter the A drive pulse transfers the information from core 1 to core 2.

Information must first be stored on core 1 before it is transferred from core 2. The information on core 1 may be a "zero" or a "one" depending upon the absence or presence of the X input pulse. When a "one" is entered, that is, the X input pulse is applies to winding N*c* of core 1, it switches the flux from the +B*r* state to the —B*r* state. (A previous A drive pulse had already driven the core to the +B*r* state.) In switching from the +B*r* state to the —B*r* state a voltage is induced in all the windings on the core. The magnitude of the voltage depends upon the number of turns and the rate of change of the flux. The voltage induced in winding N*b* will cause no current flow because in the absence of an A drive pulse the A driving pulse source (not shown) presents an extremely high impedance to this circuit. The circuit which includes winding N$a$ of core 1 includes winding N$a$ of core 2, resistor R, and winding N$a$ of core 3. The voltage induced in winding N$a$ of core 1 is in such a direction as to cause current flow towards point 14.

As previously stated, this action occurs at the time the B drive pulse is interrogating core 2. At this time one of two conditions can exist. If core 2 is switching from —B to a +BR there will be a voltage induced in winding N$a$ of core 2 in a direction to drive current towards point 14 and in the direction opposite to the current flow from winding N$a$ of core 1. Thus, the direction of current flow depends upon which voltage is the greater. Ideally the voltages should be the same although a small current leakage is permissable. If the other condition exists and core 2 is already saturated in the +B$r$ state, the B drive pulse develops no voltage in the core 2 windings. The N$c$ winding sends out no X output pulse and no current is induced in winding N$a$ to oppose the pulse from N$a$ of core 1 as the X input pulse is driven core 1 to its —B$r$ state. The resistance of R is small so very little voltage is developed across it. Winding N$a$ on core 4 is so wound that this current pulse will tend to drive core 4 out of saturation, presenting a high impedance to current flow. As shown, core 4 is maintained in saturation by winding N$b$ connected to battery E. Thus it may be seen that in cocking core 1, i.e., storing a "1" or driving core 1 to its —B$r$ state by the X input pulse, no X output pulse is produced from core 2.

At this point a function of core 3 should be noted. Suppose there is no X input pulse on core 1 and an X output pulse is being transferred from core 2 by the B drive pulse. During this time a voltage will be induced in winding N$a$ core 2 in a direction to drive current toward point 14. Since core 1 is at positive saturation (in its +B$r$ state) there is no opposing current flow to impede current flow from winding N$a$ of core 2. This current flow tends to reset core 1 to its —B$r$ saturation state and may be assisted by a small trickle current in winding N$c$ which is not large enough by itself to reset the core. Since these two currents might possibly reset core 1, circuit design requires that the sum of these currents be kept below some threshold value. Winding N$a$ on core 3 is used for this purpose. Core 3 is normally saturated by battery E in its positive or +B$r$ state and requires a current in the direction of arrow 18, i.e., the current pulse from core 2 to drive it from saturation and thus provide a large impedance in this circuit. This then prevents the false storing of a "1" in core 1 in the absence of an X input pulse.

Battery E is for the purpose of bringing the cores 3 and 4 back to positive saturation. When this occurs a voltage will be induced in the windings of the cores. However, the rate of change of flux will be slow so the voltage will be small and current flow held to a minimum during this time.

Figure 3:
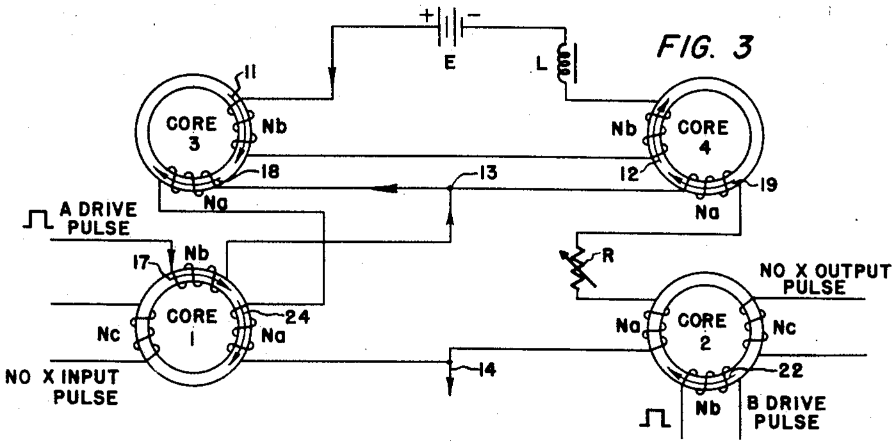
Figure 3 is a schematic with arrows showing the operation when a "0" is stored in core 1.

The principal function of the circuit in Figure 2 and Figure 3 is for the A drive pulse to interrogate core 1 and, if a "1" has been stored, to cause an X output pulse from core 2. If an "0" has been stored, as in Figure 3, the A drive pulse will not produce the output pulse. When an "0" is stored in core 1 essentially a short circuit exists between the input of winding N$b$ of core 1 and point 14, since cores 1 and 3 are at positive saturation. Cores 2 and 4 are also in the positive saturation condition but the impedance of winding N$a$ of core 2 would be high towards current flowing in that path. Current in winding N$b$ drives the core 1 further into positive saturation, as does the current in winding N$a$ of core 3 further saturates core 3. Current through winding N$a$ of core 1 only drives core 1 further into positive saturation. This "short circuit" of the pulse return path is sufficient to prevent core 2 from switching regardless of any possible current flow. However, resistor R is inserted in the pulse transfer circuit to lower current flow in this circuit as an extra precaution.

The other condition exists when a "1" has been stored in core 1, as in Figure 2. The A pulse current in winding N$b$ core 1 switches the flux in this core from its —B$r$ state towards positive saturation. If any of this current should move to the left at point 13 and flow in winding N$a$ of core 1 it would only cause this core to start switching faster. The instant a voltage appears across winding N$a$ core 1, due to transformer action as core 1 is changing its state, it tends to produce a current opposing the current produced by the A drive pulse and is also of such magnitude as to overcome the bias on core 3. By design, the switch time of core 3 is shorter than the switch time of core 1 to insure complete switching of core 3. Thus, core 3 will go from its +B$r$ state to its —B$r$ state faster than core 1 goes from —B$r$ to +B$r$. Due to the voltage across winding N$a$ of core 1 as core 1 is switching, winding N$a$ of core 3 tends to make the pulse return path a high impedance path, limiting the current flow in this path and thus causing the A drive pulse to appear in the pulse transfer path. The increased impedance of core 3 is a desirable but not a necesasry feature, so that in reality the bias cores 3 and 4 perform no essential function during the operational time of pulse A.

While certain preferred embodiments of the invention have been specifically disclosed, it is understood that the invention is not limited thereto as many variations will be readily apparent to those skilled in the art and the invention is to be given its broadest possible interpretation within the terms of the following claims:

What I claim is:

1. A magnetic core switching circuit comprising a pulse return path, a pulse transfer path, a magnetic core having a plurality of windings thereon, means for connecting a pulse energy source to said paths through a first of said windings, said pulse return path including a second of said windings, means for connecting a third of said windings to an input pulse source, said first winding being wound in such manner that pulses from said pulse energy source urge said core toward one state of magnetization, said third winding being wound in such manner that pulses from said input pulse source urge said core toward another state of magnetization, said pulse transfer path including a magnetic core, a coil thereon, said coil being wound on said core so as to change the bias of said core when said coil is energized, said core having an output pulse coil thereon energized by changes of magnetic state of said core.

2. A magnetic core switching circuit comprising a pulse return path, a pulse transfer path and means for selectively directing pulse flow from a source to one of said paths, said transfer path including a first and second magnetic core, a first winding on said first core and a second winding on said second core, said first core being biased in a direction that energy flow through said first winding from said source assists biasing in said direction, said second core having a magnetic state such that energy flow through said second winding will change its magnetic state, said second core having an output winding thereon responsive to said change of magnetic state.

3. A magnetic core switching circuit comprising a pulse return path and a pulse transfer path, a first and third core having coils thereon in said return path, a second core having a coil thereon in said transfer path, a drive pulse energizing coil on said first core and connected to both said paths, said drive pulse energizing coil being so wound on said first core as to drive said first core toward one state of magnetization, an input pulse coil wound on said first core so as to drive said first core away from said one state of magnetization, said return path coil on said first core being wound on said first core so as to have a voltage induced therein opposing said drive pulse in said pulse return path when said input pulse coil is energized.

4. A magnetic core switching circuit as in claim 3, means for biasing said third core in a direction to present a low impedance in said return path coil thereon to drive pulses, said third core return path coil being wound on said third core so as to change its bias when said voltage is induced in said first core return path coil.

5. A magnetic core switching circuit as in claim 3, means for driving said second core toward one state of magnetization, said second core transfer path coil being so wound as to drive said second core toward another state of magnetization when said second core transfer path coil is energized with said driving pulses, said second core having an output pulse coil thereon energized by changes of magnetic state of said second core.

6. A magnetic core switching circuit comprising a pulse return path and a pulse transfer path, a first and third core having coils thereon in said return path, a second and fourth core having coils thereon in said transfer path, a drive pulse energizing coil on said first core and connected to both said paths, said drive pulse energizing coil being so wound on said first core as to drive said first core toward one state of magnetization, an input pulse coil wound on said first core so as to drive said first core away from said one state of magnetization, said return path coil on said first core being wound on said first core so as to have a voltage induced therein opposing said drive pulse in said pulse return path, means for biasing said third core in a direction to present a low impedance in said return path coil thereon to drive pulses, said third core return path coil being wound on said third core so as to change its bias when said voltage is induced in said first core return path coil, means for driving said second core toward one state of magnetization, said second core transfer path coil being so wound as to drive said second core toward another state of magnetization when said second core transfer path coil is energized with said driving pulses, said second core having an output pulse coil thereon energized by changes of magnetic state of said second core.

7. A magnetic core switching circuit comprising a pulse return path, a pulse transfer path, a magnetic core having a plurality of windings thereon, means for connecting a pulse energy source to said paths through a first of said windings, said pulse return path including a second of said windings, means for connecting a third of said windings to an input pulse source, said first winding being wound in such manner that pulses from said pulse energy source urge said core toward one state of magnetization, said third winding being wound in such manner that pulses from said input pulse source urge said core toward another state of magnetization, said pulse return path including a core biased toward one state of magnetization and a winding thereon in circuit in said path, said winding being wound thereon in such manner as to drive said core from said biased condition when energized by said second winding on said first named core.

References Cited in the file of this patent

UNITED STATES PATENTS

| | | |
|---|---|---|
| 2,719,773 | Karnaugh | Oct. 4, 1955 |
| 2,729,807 | Paivinen | Jan. 3, 1956 |